US010350737B2

(12) United States Patent
Hsieh

(10) Patent No.: US 10,350,737 B2
(45) Date of Patent: Jul. 16, 2019

(54) T-TORQUE WRENCH

(71) Applicant: Wei-Ning Hsieh, Taichung (TW)

(72) Inventor: Wei-Ning Hsieh, Taichung (TW)

( * ) Notice: Subject to any disclaimer, the term of this patent is extended or adjusted under 35 U.S.C. 154(b) by 56 days.

(21) Appl. No.: 15/815,586

(22) Filed: Nov. 16, 2017

(65) Prior Publication Data

US 2019/0143494 A1 May 16, 2019

(51) Int. Cl.
*B60B 29/00* (2006.01)
*B60C 23/04* (2006.01)
*B25B 23/142* (2006.01)

(52) U.S. Cl.
CPC ...... *B25B 23/1425* (2013.01); *B60C 23/0415* (2013.01); *B60C 23/0493* (2013.01); *B60B 29/003* (2013.01)

(58) Field of Classification Search
CPC ............ B25B 23/1425; B60C 23/0415; B60C 23/0493; B60B 29/003
See application file for complete search history.

(56) References Cited

U.S. PATENT DOCUMENTS 9,095,966 B2 * 8/2015 Hsieh .................. B60C 23/0496
2008/0111703 A1 * 5/2008 Hsieh .................. B25B 23/1425 340/665
2018/0043517 A1 * 2/2018 Gauthier ............. B25B 23/1425
2019/0001470 A1 * 1/2019 Hsieh .................. B25B 23/0007

* cited by examiner

*Primary Examiner* — David B. Thomas

(57) ABSTRACT

A T-torque wrench contains: a body including a horizontal handle and a vertical extension. The vertical extension has a fitting connector formed on a bottom thereof and configured to fit with sockets of various sizes, and the vertical extension has a strain gauge arranged on one end thereof so as to detect operation torques of the T-torque wrench, the horizontal handle has a tire-pressure detection connector connected on one end thereof. The body includes a casing covered thereon and includes a digital processing unit electrically connected with the strain gauge of the vertical extension and the tire-pressure detection connector of the horizontal handle, the casing includes a display module arranged thereon and electrically connected with the digital processing unit, and the casing includes a control module arranged thereon between the display module and the horizontal handle, wherein the control module is electrically connected with the digital processing unit.

3 Claims, 3 Drawing Sheets

1
112
16
11
13
15
14
12
111
121

T-TORQUE WRENCH

FIELD OF THE INVENTION

The present invention relates to a T-torque wrench which is applied to replace tires of vehicles and to detect pressures of the tires.

BACKGROUND OF THE INVENTION

A conventional torque wrench is capable of setting operation torque values so as to lock or unlock screw bolts and nuts.

A digital torque wrench contains a hollow body, a drive head, a strain gauge section accommodated in the hollow body and extending to the drive head, at least one sensor fixed in the strain gauge section, a torque setting device mounted on the hollow body so as to input a torque set value, a comparator arranged on the hollow body and connected with the sensor and the torque setting device, and an electromagnetic trip element having a movable stem extending from the hollow body and corresponding to the drive head, wherein the electromagnetic trip element electrically connected with the comparator, and the movable stem expends outwardly or retracts inwardly to stop the drive head.

However, the conventional torque wrench and the digital torque wrench cannot detect pressures of vehicles.

The present invention has arisen to mitigate and/or obviate the afore-described disadvantages.

SUMMARY OF THE INVENTION

The primary aspect of the present invention is to provide a T-torque wrench which is applied to replace tires of vehicles and to detect pressures of the tires.

To obtain the above mentioned aspect, a T-torque wrench provided by the present invention contains: a body including a horizontal handle and a vertical extension straightly extending outward from a bottom of the horizontal handle.

The vertical extension has a fitting connector formed on a bottom thereof and configured to fit with sockets of various sizes, and the vertical extension has a strain gauge arranged on one end thereof so as to detect operation torques of the T-torque wrench, the horizontal handle has a tire-pressure detection connector connected on one end thereof.

The body includes a casing covered thereon and includes a digital processing unit electrically connected with the strain gauge of the vertical extension and the tire-pressure detection connector of the horizontal handle, the casing includes a display module arranged thereon and electrically connected with the digital processing unit, and the casing includes a control module arranged thereon between the display module and the horizontal handle, wherein the control module is electrically connected with the digital processing unit.

Preferably, the horizontal handle further has a polygonal orifice defined on a top thereof opposite to the vertical extension.

Preferably, the casing has a battery module arranged on the horizontal handle thereof.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
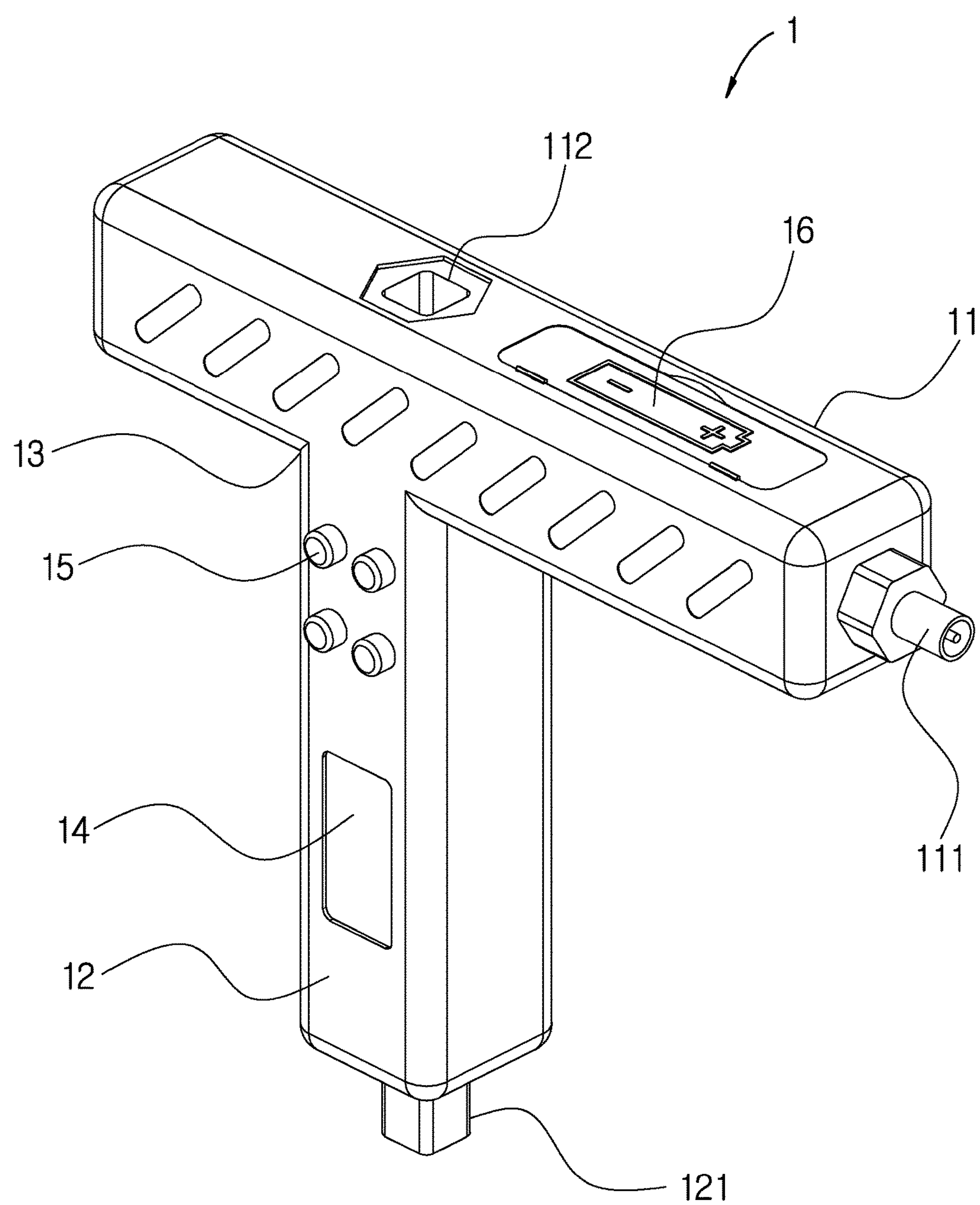
FIG. 1 is a perspective view showing the assembly of a T-torque wrench according to a preferred embodiment of the present invention.
Figure 2:
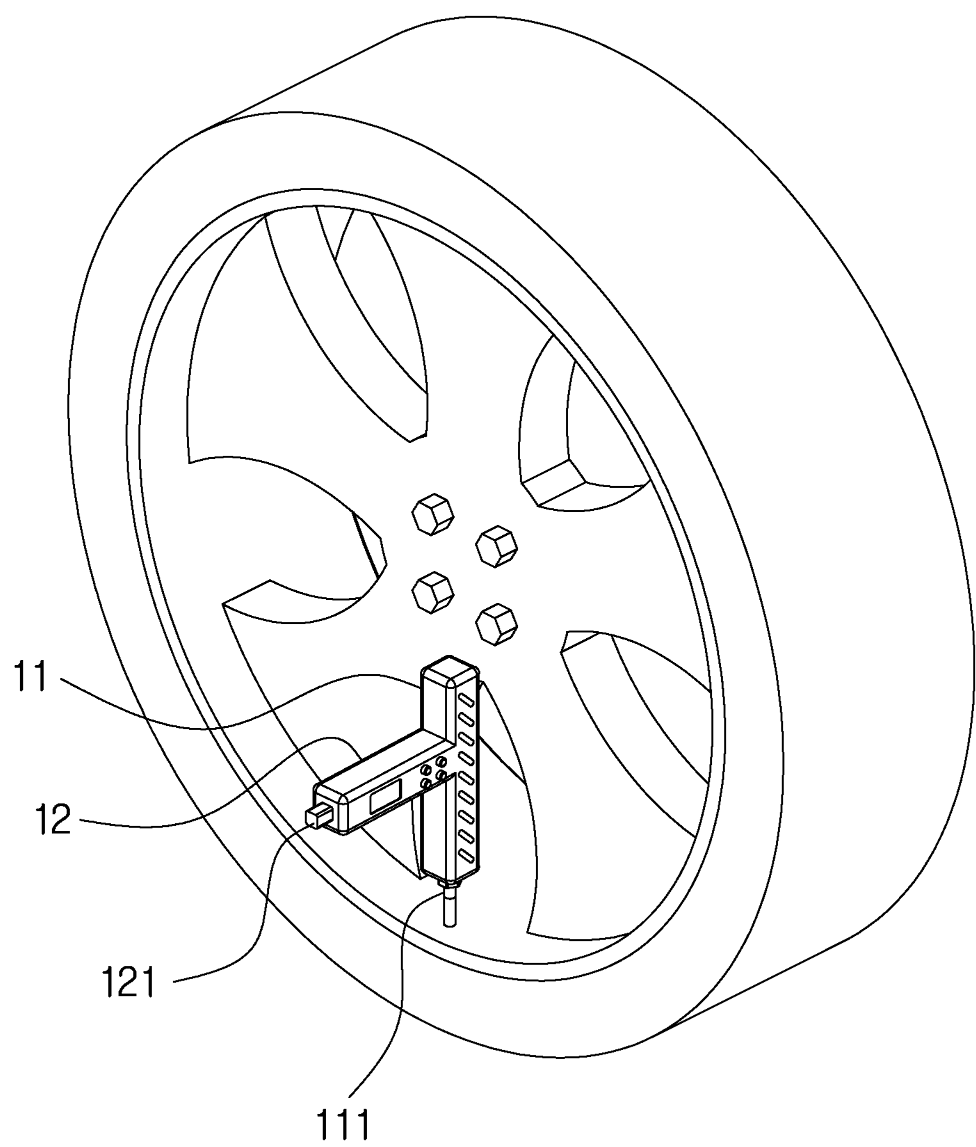
FIG. 2 is a perspective view showing the application of the T-torque wrench according to the preferred embodiment of the present invention.
Figure 3:
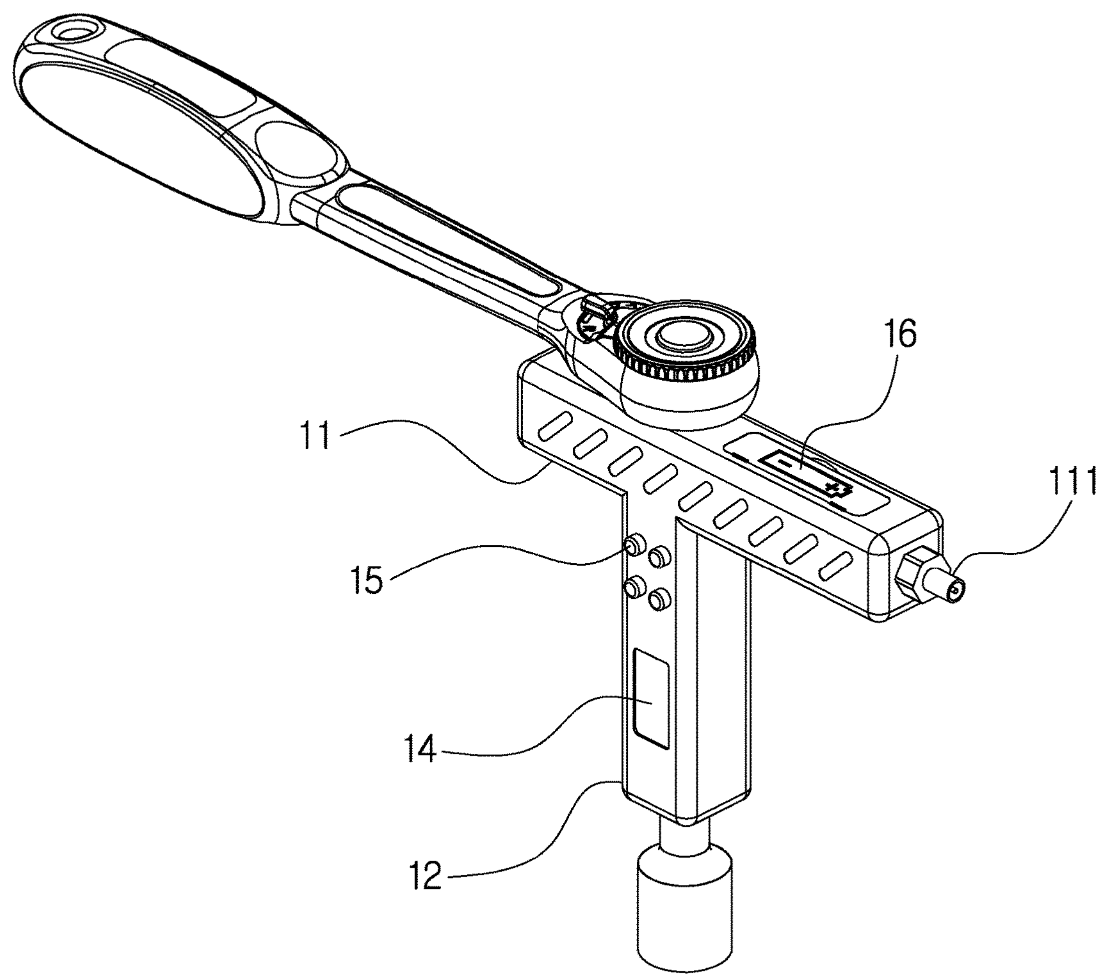
FIG. 3 is another perspective view showing the application of the T-torque wrench according to the preferred embodiment of the present invention.

With reference to FIGS. 1-3, a T-torque wrench in accordance with a preferred embodiment of the present invention is applied to replace tires of vehicles and to detect pressures of the tires. The T-torque wrench comprises a body 1 including a horizontal handle 11 and a vertical extension 12 straightly extending outward from a bottom of the horizontal handle 11.

The vertical extension 12 has a fitting connector 121 formed on a bottom thereof and configured to fit with sockets of various sizes, and the vertical extension 12 has a strain gauge (not shown) arranged on one end thereof so as to detect operation torques of the T-torque wrench. The horizontal handle 11 has a tire-pressure detection connector 111 connected on one end thereof.

The body 1 includes a casing 13 covered thereon and includes a digital processing unit (not shown) electrically connected with the strain gauge of the vertical extension 12 and the tire-pressure detection connector 111 of the horizontal handle 11. The casing 13 includes a display module 14 arranged thereon and electrically connected with the digital processing unit, and the casing 13 includes a control module 15 arranged thereon between the display module 14 and the horizontal handle 11, wherein the control module 15 is electrically connected with the digital processing unit so as to switch the digital processing unit to display values of the operation torques of the T-torque wrench or values of the pressures of the tires.

Thereby, the fitting connector 121 fits with sockets of various sizes so as to lock the sockets. Preferably, the strain gauge of the vertical extension 12 detects the values of the operation torques after the T-torque wrench locks the sockets, and the tire-pressure detection connector 111 detects the pressures of the tires (as shown in FIG. 2), thus replacing the tires and detecting the pressures of the tires by way of the T-torque wrench.

The horizontal handle 11 further has a polygonal orifice 112 defined on a top thereof opposite to the vertical extension 12, hence the polygonal orifice 112 connects with a ratchet wrench or an elbow wrench so as to rotate the T-torque wrench, as illustrated in FIG. 3.

Furthermore, the casing 13 has a battery module 16 arranged on the horizontal handle 11 thereof.

While various embodiments in accordance with the present invention have been shown and described, it is clear to those skilled in the art that further embodiments may be made without departing from the scope of the present invention.

What is claimed is:

1. A T-torque wrench comprising: a body including a horizontal handle and a vertical extension straightly extending outward from a bottom of the horizontal handle;

wherein the vertical extension has a fitting connector formed on a bottom thereof and configured to fit with sockets of various sizes, and the vertical extension has a strain gauge arranged on one end thereof so as to detect operation torques of the T-torque wrench, the horizontal handle has a tire-pressure detection connector connected on one end thereof;

wherein the body includes a casing covered thereon and includes a digital processing unit electrically connected with the strain gauge of the vertical extension and the tire-pressure detection connector of the horizontal handle, the casing includes a display module arranged thereon and electrically connected with the digital processing unit, and the casing includes a control module arranged thereon between the display module and the horizontal handle, wherein the control module is electrically connected with the digital processing unit.

2. The T-torque wrench as claimed in claim 1, wherein the horizontal handle further has a polygonal orifice defined on a top thereof opposite to the vertical extension.

3. The T-torque wrench as claimed in claim 1, wherein the casing has a battery module arranged on the horizontal handle thereof.

* * * * *